US010949288B2

(12) United States Patent
Hopkins et al.

(10) Patent No.: US 10,949,288 B2
(45) Date of Patent: *Mar. 16, 2021

(54) STREAMING SERVER STATISTICS AND PREDICTIVE MITIGATION

(71) Applicant: Level 3 Communications, LLC, Broomfield, CO (US)

(72) Inventors: William Hopkins, Brighton, CO (US); Lawrence W. Gowin, Westminster, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/035,838

(22) Filed: Sep. 29, 2020

(65) Prior Publication Data

US 2021/0011798 A1    Jan. 14, 2021

Related U.S. Application Data

(63) Continuation of application No. 16/020,681, filed on Jun. 27, 2018, now Pat. No. 10,795,757.

(Continued)

(51) Int. Cl.
*G06F 11/00*    (2006.01)
*G06F 11/07*    (2006.01)
(Continued)

(52) U.S. Cl.
CPC ........ *G06F 11/0793* (2013.01); *G06F 3/0619* (2013.01); *G06F 11/079* (2013.01);
(Continued)

(58) Field of Classification Search
CPC .......................... G06F 11/0793; H04L 41/142
See application file for complete search history.

(56) References Cited

U.S. PATENT DOCUMENTS

| 7,401,012 | B1 | 7/2008 | Bonebakker et al. |
| 10,033,575 | B2 | 7/2018 | Steeves |

(Continued)

OTHER PUBLICATIONS

International Preliminary Report on Patentability, dated Dec. 31, 2019, Int'l Appl. No. PCT/US18/039836, Int'l Filing Date Jun. 27, 2018; 10 pgs.

(Continued)

*Primary Examiner* — Jonathan D Gibson

(57) ABSTRACT

Aspects of the present disclosure involve systems and methods for improving the performance of a telecommunications network by monitoring the performance of one or more storage drives. Operational data is received from a plurality of storage drives of a storage server of a telecommunications network. A plurality of operational coefficients for each of the plurality of storage drives is derived based on the operational data, and a cluster plot is created from the plurality of operational coefficients for each of the plurality of storage drives. A distance is calculated between a subset of operational coefficients of the plurality of operational coefficients of the cluster plot, and a remedial action is initiated on a storage drive of the plurality of storage drives when a calculated distance of an operational coefficient associated with the storage drive exceeds a distance value from a cluster of the cluster plot.

17 Claims, 6 Drawing Sheets

Related U.S. Application Data

(60) Provisional application No. 62/526,485, filed on Jun. 29, 2017.

(51) Int. Cl.
 *H04L 12/24* (2006.01)
 *G06F 3/06* (2006.01)
 *H04L 12/26* (2006.01)

(52) U.S. Cl.
 CPC ........ *G06F 11/0754* (2013.01); *H04L 41/142* (2013.01); *H04L 41/147* (2013.01); *H04L 41/16* (2013.01); *G06F 2201/80* (2013.01); *G06F 2201/81* (2013.01); *G06F 2201/82* (2013.01); *H04L 43/08* (2013.01)

(56) References Cited

U.S. PATENT DOCUMENTS

| | | | |
|---|---|---|---|
| 10,177,969 B2 | 1/2019 | Steeves | |
| 10,795,757 B2* | 10/2020 | Hopkins | ............... G06F 11/079 |
| 2008/0209274 A1 | 8/2008 | Nicholson | |
| 2010/0153787 A1 | 6/2010 | Beattie | |
| 2013/0343213 A1 | 12/2013 | Reynolds et al. | |
| 2015/0244769 A1 | 8/2015 | Khaimov | |
| 2015/0372969 A1 | 12/2015 | Hopkins et al. | |
| 2016/0224277 A1 | 8/2016 | Batra et al. | |
| 2016/0253598 A1* | 9/2016 | Yamada | .................. G06N 20/00 706/12 |
| 2017/0171040 A1* | 6/2017 | Randolph | ............. G06F 16/248 |
| 2017/0201897 A1 | 7/2017 | Yang | |
| 2018/0091619 A1 | 3/2018 | Power et al. | |
| 2018/0145874 A1 | 5/2018 | Steeves | |
| 2018/0285320 A1 | 10/2018 | Yang | |
| 2018/0331889 A1 | 11/2018 | Steeves et al. | |
| 2019/0004892 A1 | 1/2019 | Hopkins et al. | |
| 2020/0065212 A1* | 2/2020 | Chanda | ............... G06F 11/3452 |
| 2021/0011798 A1* | 1/2021 | Hopkins | ................. H04L 41/16 |

OTHER PUBLICATIONS

International Search Report and Written Opinion of the International Searching Authority, dated Sep. 17, 2018, Int'l Appl. No. PCT/US18/039836, Int'l Filing Date Jun. 27, 2018; 16 pgs.

\* cited by examiner

STREAMING SERVER STATISTICS AND PREDICTIVE MITIGATION

TECHNICAL FIELD

Embodiments of the present invention generally relate to systems and methods for implementing a telecommunications network, and more specifically for monitoring the performance of one or more storage drives or other network equipment to improve the performance of the telecommunications network.

BACKGROUND

The Internet and the World Wide Web (the "Web") are easily accessible to process, store, transmit, access, and otherwise operate on many types of data and information. Content providers (publishers) now use the Internet (and, particularly, the Web) to provide all kinds of content to numerous users throughout the world. However, providing access to such content to requestors throughout the world can quickly become costly to many providers. In order to offload the job of serving some or all of its content, many content providers now operate or subscribe to content delivery networks (CDNs). Using a CDN, content can be served to clients or requestors from the CDN (e.g., from one or more servers dedicated to hosting and providing content from content providers) instead of from the content provider's server(s) directly.

Numerous forms of content may be served from a CDN. For example, television shows, movies, and other video files may now be accessed or streamed from any number of Web sites, which may be served from a CDN. Print newspapers have migrated to the Web and provide portals through which clients operating some form of computing device (e.g., PC, smart phone, or tablet) with a browser may access numerous forms of content, such as short video clips, articles, images, and audio tracks. Software updates and patches, once provided on disc and mailed to recipients, are now routinely distributed to devices from a CDN through one or more network connections and devices. The CDN provides for widespread distribution of such content to users all over the world.

SUMMARY

Aspects of the present disclosure involve systems and methods for improving the performance of a telecommunications network by monitoring the performance of one or more storage drives. Operational data is received from a plurality of storage drives of a storage server of a telecommunications network. A plurality of operational coefficients for each of the plurality of storage drives is derived based on the operational data, and a cluster plot is created from the plurality of operational coefficients for each of the plurality of storage drives. A distance is calculated between a subset of operational coefficients of the plurality of operational coefficients of the cluster plot, and a remedial action is initiated on a storage drive of the plurality of storage drives when a calculated distance of an operational coefficient associated with the storage drive exceeds a distance value from a cluster of the cluster plot.

DETAILED DESCRIPTION

Figure 1:
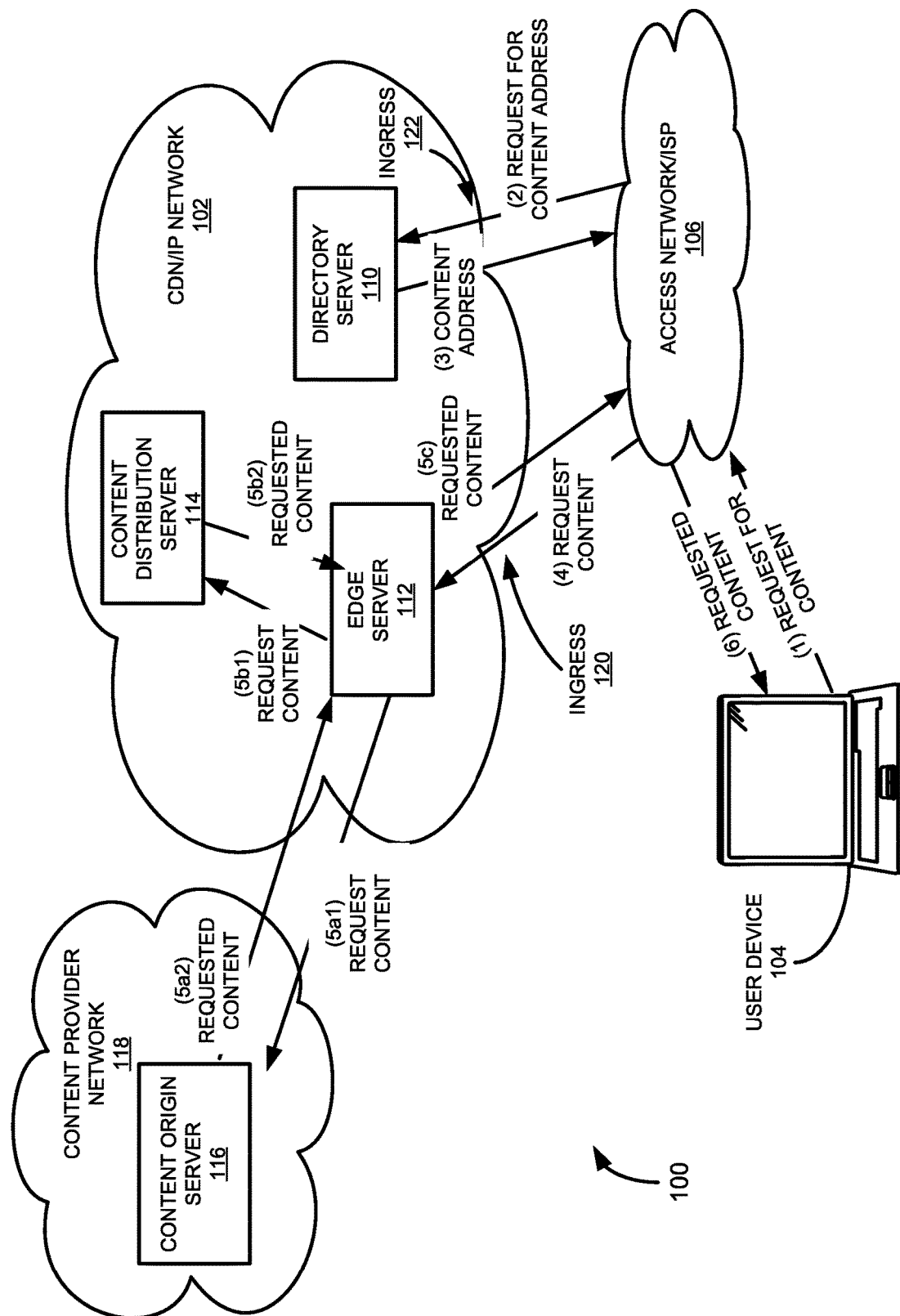
FIG. 1 is an example network environment for distributing content over a telecommunications network.

Aspects of the present disclosure describe systems, methods, computer program products, and the like, for monitoring operational data of one or more storage server drives of a network, such as a content delivery network (CDN), and analyzing the operational data to identify a potentially failing storage drive. Once identified, a remedial action may be performed on the failing storage drive based on the measured operational data of the drive or collection drives. In one particular embodiment, a monitoring device periodically receives measured operational data from a plurality of storage drives of a storage server or cluster. With the received storage drive operational data, the monitoring device may create an equation for each drive associated with the storage server that includes a plurality of coefficients associated with particular performance metrics of the drives. The coefficients for all or some of the storage drives may be then be cluster plotted together to determine if an outlier storage drive is plotted in the graph. Any outlying storage drive may be identified as failing or underperforming. One or more remedial actions, such as reformatting, resetting, or removal from service, may be performed on the outlying storage drive.

In one instance, the type of remedial action may be based at least on a distance measurement from the other storage drives in the cluster plot, such that storage drives further away from the other storage drives in the cluster plot receive a higher priority for maintenance, or even removal, of the underperforming drive.

In another embodiment, the monitoring device may create an operating equation for a model storage drive similar to the storage drives in the storage server. In one instance, the model equation may include a plurality of model coefficients generated through one or more machine learning techniques to tune the coefficients over several iterations of drive operation and performance monitoring. After machine learning, the model equation may thus include the plurality of model coefficients to indicate an optimal operating range for the associated storage drive. Similar to above, the model coefficients may then be cluster plotted with the coefficients for all or some of the storage drives obtained above. A deviance from the model coefficient plot may indicate an underperforming drive such that a corresponding remedial action may be undertaken on the storage drive. Further, the model equation may be utilized to analyze various types of storage drives to provide the network administrator a tool by which performance characteristics of a storage drive type may be determined for use in the network. Through either embodiment, a more targeted monitoring of the performance of storage drives in the network may be conducted and a type of remedial action may be determined for certain storage drives based on the level of underperformance of the identified storage drives.

Regardless of the type of content that is being stored and provided, CDNs typically include numerous storage servers or other networking devices that conduct high volumes of memory storage and management. A storage server may include numerous storage drives, of varying types, which receive, store, and provide content upon a request for the stored content. In various CDN architectures, such drives may be located at edge caches, various mid-tier caches, or direct origin storage. In some examples, several storage servers may be clustered together by the CDN in what is referred to as a "storage cluster" within the network. As used herein, the term "storage server" may refer to both storage server devices and/or a cluster of storage servers (either physical servers or virtual servers). As should be appreciated, performance of the storage servers or clusters may directly impact the performance of the CDN in providing requested data. In other words, failure or a slowdown at a storage server may slowdown delivery of data to a customer of the CDN, particularly in instances where the customer is streaming a video or requesting other large data files.

Performance of a storage server or cluster is often dependent on the worst performing storage drive within the server or cluster. Thus, although many of the storage drives are operating correctly, a single improperly operating storage drive may drive down the overall performance of the storage server or cluster (typically due to the load balancing technique the storage server provides across all of the associated drive). Once a storage server or cluster is determined to be underperforming, the server is typically removed from the CDN, such as being taken offline for maintenance, providing a performance cost onto the other functioning storage servers of the CDN as they work to carry the load of the removed server. The maintenance of the storage server may also be costly to an operator of the CDN, such that monitoring and quick recovery of underperforming servers is important in providing an efficient CDN or any other type of network that utilizes storage drives.

Referring to FIG. 1, an example network environment 100 for distributing content to one or more requesting devices is shown. Although illustrated in FIG. 1 as a content delivery network, it should be appreciated that aspects of the present disclosure may apply to any type of telecommunications network that utilizes network components that include storage devices, such as a storage drive or group of storage drives. For example, aspects of the disclosure may be utilized to analyze application servers, database systems and other computing systems with storage capabilities. Thus, although the CDN architecture is used throughout the document as the example network architecture through which aspects of the present disclosure may be applied; other network architectures and configurations are similarly contemplated.

In one implementation of the network environment 100, a CDN 102 is communicably coupled to one or more access networks 106. In general, the CDN 102 comprises one or more components configured to provide content to a device upon a request, and an underlying IP network through which the request is received and the content is provided. The underlying IP network associated with the CDN servers may be of the form of any type IP-based communication network configured to transmit and receive communications through the network and may include any number and types of telecommunications components. In this manner, CDN-based components may be added to an existing IP-based communication network such that the components receive a request for content, retrieve the content from a storage device, and provide the content to the requesting device through the supporting IP network. For simplicity, the use of the term "CDN" throughout this disclosure refers to the combination of the one or more content servers and the underlying IP network for managing and providing content.

In one embodiment, a device 104 connects to the CDN 102 through one or more access networks 106 to request and receive digital content from the CDN. The access network 106 may be under the control of or operated/maintained by one or more entities, such as, for example, one or more Internet Service Providers (ISPs) that provide access to the CDN 102. Thus, for example, the access network 106 may provide Internet access to for the device 104. In addition, the access network 106 may include several connections to the IP network of the CDN 102. For example, access network 106 includes access point 120 and access point 122. Also, the device 104 may be connected to any number of access networks 106 such that access to the CDN 102 may occur through another access network. In general, access to a CDN 102 (or underlying IP network associated with the CDN) may occur through any number of ingress ports to the CDN through any number of access networks.

The CDN 102 is capable of providing content to a device 104, which is generally any form of computing device, such as a personal computer, mobile device, tablet (e.g., iPad), smart TV, game console, or the like. Content may include, without limitation, videos, multimedia, images, audio files, text, documents, software, and other electronic resources. The device 104 is configured to request, receive, process, and present content (step 1). In one example, the device 104 includes an Internet browser at which a website provides a link (e.g., a hyperlink) that may be selected or otherwise entered, causing a request to be sent to a directory server 110 in the CDN 102 (step 2) to obtain content associated with the link.

The directory or authoritative server 110 responds to the request by providing a network address (e.g., an IP address) where the content associated with the selected link can be obtained (step 3). In one implementation, the directory server 110 provides a domain name system (DNS) service, which resolves an alphanumeric domain name to an IP address. The directory server 110 resolves the link name (e.g., URL or other identifier) to an associated network address from which the device 104 can retrieve the content. In some instances, the access network 106 may also include a DNS service. The operation of the directory server 110 and access network 106 to resolve requests for content from the device 104 is discussed in more detail below with reference to FIG. 2.

The CDN 102 can include an edge server 112, which may cache content from another server to make it available in a more geographically or logically proximate location to the device 104. The edge server 112 may reduce network loads, optimize utilization of available capacity, lower delivery costs, and/or reduce content download time. The edge server 112 can be configured to provide requested content to a requestor, which may be the device 104 possibly via an intermediate device, for example, in the access network 106 (step 4 and step 5c). In one example, the edge server 112 can provide the requested content that is locally stored in cache. In another example, the edge server 112 retrieves the requested content from another source, such as a media access server (MAS) (e.g., a content distribution server 114 (steps 5b1 and 5b2) or a content origin server 116 (steps 5a1 and 5*a*2) of a content provider network 118). The content is then served to the device 104 in response to the requests (step 6).

Any of the components described in relation to FIG. 1 may include one or more storage drives for storing and providing data. For example, edge server 112 may include several storage drives that store content available to the device 104, instructions for operating the edge server 112, CDN management data, and the like. In general, any type of data may be stored and managed by the storage drives of the network components. Further, the storage drives may be any type of storage drives including so called spinning disk and solid-state, which may include magnetic and/or optical storage mediums; and solid-state drives. Groups of drives may be clustered together by the network, whether included in a single network device or in a group of network devices. As explained above, the performance and operation of the storage drives within a CDN may affect the efficiency and speed of the network such that monitoring of the drives and replacement or other remedial actions on underperforming drives may improve the overall performance of the CDN.

Figure 2:
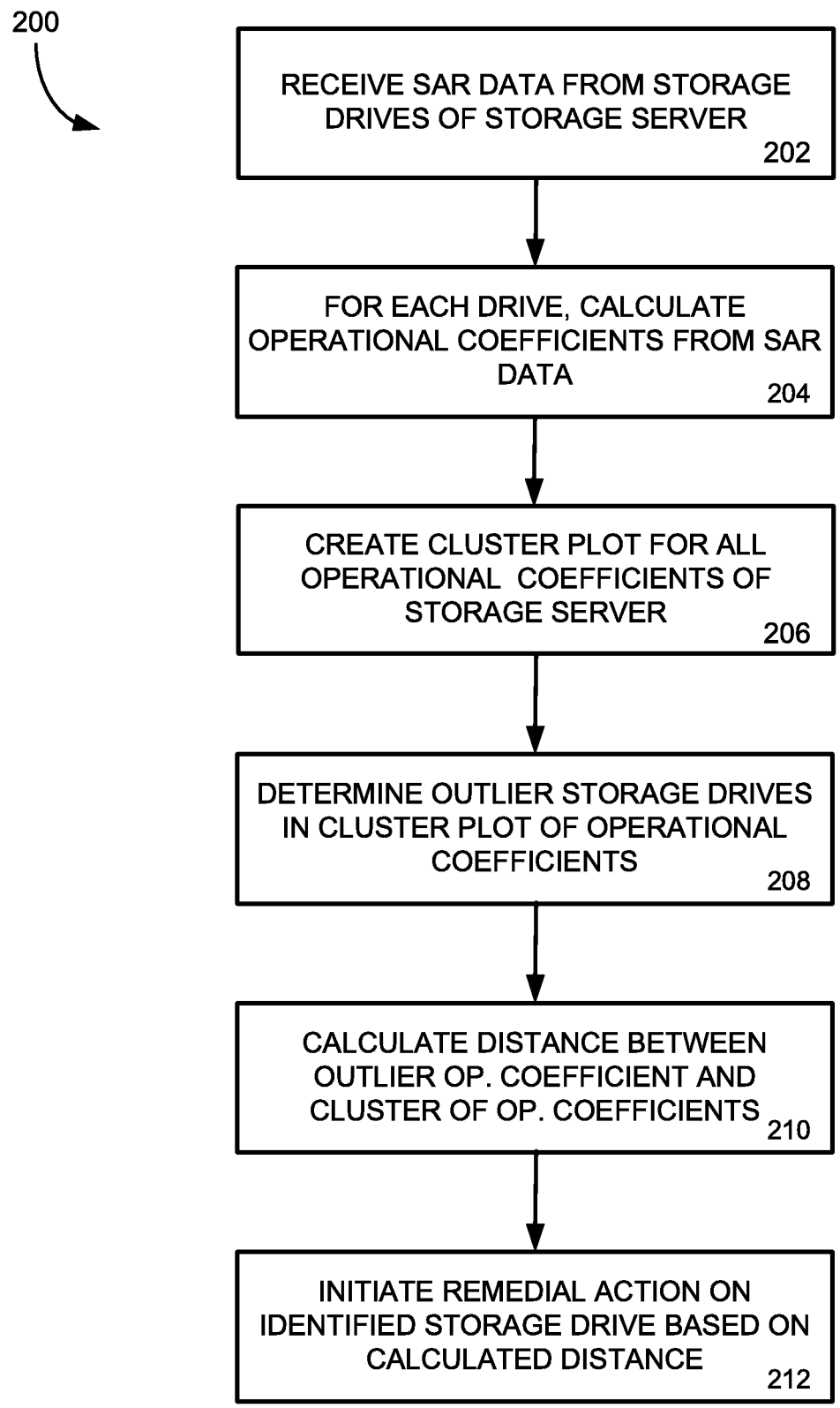
FIG. 2 is a flowchart of a method for receiving and modeling system operational data from a plurality of storage drives to identify performance issues in the storage drives.

To that end, FIG. 2 includes a flowchart of a method 200 for receiving and modeling system operational data from a plurality of storage drives of a network to identify performance issues in the storage drives and potentially perform a remedial action on a failing storage drive. In general, the operations of the method 200 are performed by a network monitoring tool in communication with the storage drives and/or network devices associated with the storage drives. For example, the monitoring device may be a network device of the CDN or may be a computing device of a network operations center (NOC) tasked with monitoring the performance of the storage drives. In other embodiments, one or more of the operations of the method 200 may be performed by other networking or network-related devices to monitor storage drives of the network and address detected performance issues.

Beginning in operation 202, the monitoring device receives operational data, sometimes referred to herein as a "System Activity Report" or SAR, from the storage drives in a storage server or cluster. The SAR data may be any type of operational data measured by the storage drives or the storage server associated with the drives. For example, the SAR data for each drive may include such data as transactions per second, average wait time to execute a read or write to the drive, an average request size (such as in bytes), number of write requests, number of read requests, percentage of utilization of the drive, and the like. Other types of operational data may also be included in the SAR data received from the storage drives. Further, in one embodiment, SAR data is provided to the monitoring device periodically from the storage drives, such as every five minutes. Thus, the operational data included in the SAR may be based on performance of the drive over the five minute monitoring period. For example, the transactions per second data may be an average of the number of transactions executed over the five minute monitoring period divided by the number of seconds in the period. Similarly, the number of write and read requests may be for the entire monitoring period. In general, however, the SAR data may be obtained by the storage drive for any length of a monitoring period.

In some instances, the SAR data may be automatically provided by the storage drives to the monitoring device upon the expiration of the monitoring period. In other instances, the SAR data may be provided upon receiving a request at the storage drive from the monitoring device. Also, the monitoring device may store several instances of the received SAR data. For example, the monitoring device may store up to 24 hours of SAR data, received every five minutes from the storage device, resulting in 288 groups of SAR data received and stored by the monitoring device. However, the monitoring device may store any number of received SAR data from the storage devices under analysis.

In operation 204, the monitoring device creates drive coefficients, or operational coefficients, for each storage drive from the received SAR data. In particular, the monitoring device utilizes the received SAR data for a particular drive to create a model that approximates the performance of the drive over the time period of the SAR data. For example, the monitoring device may assume that the received utilization percentage approximates a performance level of the particular drive and that other SAR data for the drive may linearly affect the utilization percentage (although non-linear relationships may also be contemplated). In other words, the more transactions per second or higher average request size, the higher the utilization percentage of the drive should be experienced. Thus, in one embodiment, the performance equation of a particular drive may take the form of:

$$\text{Utilization} = \beta_0 + \beta_1(\text{tps}) + \beta_2(\text{avreqsiz}) + \beta_3(\text{fow}) + \ldots \beta_x(\text{variable}_x) + \text{error value}$$

where tps is the received transactions per second from the SAR data, avreqsiz is the average request size from the SAR data, fow a calculated frequency of writes (number of writes/(number of writes+number of reads) from the SAR data, variable$_x$ represents other SAR data that may be received, and $\beta_0$-$\beta_x$ are the drive equation operational coefficients discussed above. In general, the equation sums one or more of the received SAR data values multiplied by the coefficients to calculate an estimated percentage utilization of the drive. To determine the operational coefficient values, the monitoring device alters or adjusts the operational coefficients through one or more machine learning techniques or statistical techniques (such as least squares regression or similar techniques) to model the performance of the associated drive.

In one example, the monitoring device creates one or more models for the utilization based on operational coefficient values from a model fitted to actual SAR data, in accordance with the performance equation discussed above. Each model is based on instances of SAR data received, measured, or determined from each drive. For example, for each drive, the utilization percentage vs the SAR data may be plotted over a number of time instances. This can be done for any type of SAR data or parameter resulting from SAR data (e.g., tps, avreqsiz, fow, variable, etc.) over any period of time, where each data point within the plot represents a measured, determined, or reported utilization percentage. In some examples, combinations of multiple SAR data types can be used (e.g., a combination of tps and fow). Once enough data points have been collected (which can be set to a specific number, such as, for example, greater than 75 data points), a model of the utilization percentage (e.g., a measure of the performance level of the particular drive) as a function of the SAR data can be determined by fitting a model to the plot.

By analyzing the fitted models, the monitoring device may determine a relationship between the predictive values of the SAR data and the received utilization results. The monitoring device can, in some examples, apply the SAR data in the plots to a machine learning algorithm or technique to generate or determine the fitted models, which may be in accordance with the performance equation above or may not (e.g., may be a non-linear model). Whatever the fitted model, the coefficients of the fitted models are the operational coefficients.

Thus, assuming the fitted model is in accordance with the performance equation, the operational coefficients ($\beta_0$-$\beta_x$) can be calculated or determined through the machine learning techniques. In some examples, the measured utilization value can be compared to an idealized utilization value. Thus, operational coefficients for a set of predictive SAR values may alternately be determined by minimizing the difference between the measured utilization value (based on the set of predictive SAR values) and the estimated utilization value calculated from the model equation.

It should be appreciated that any SAR value or combination of SAR values may be used to measure the performance of the storage drive. Any drive response variable may be utilized by the monitoring device to determine an estimated performance of a storage device.

The monitoring device may conduct a similar analysis for each storage drive in a storage server or cluster. Upon completion of the calculation or determination of the operational coefficients for each storage drive in the storage server, the monitoring device may then plot the operational coefficients for each storage drive in the storage server in a cluster plot in operation 206. In general, cluster analysis is a process of grouping a set of values in a plot such that the groups of values that are similar are clustered together in the plot while groups of values with different values are clustered in other clusters or groups in the plot. One of ordinary skill in the art would be aware of the various types of clustering algorithms that may be utilized to cluster plot the derived operational coefficients from the storage drive SAR data received at the monitoring device.

Figure 3:
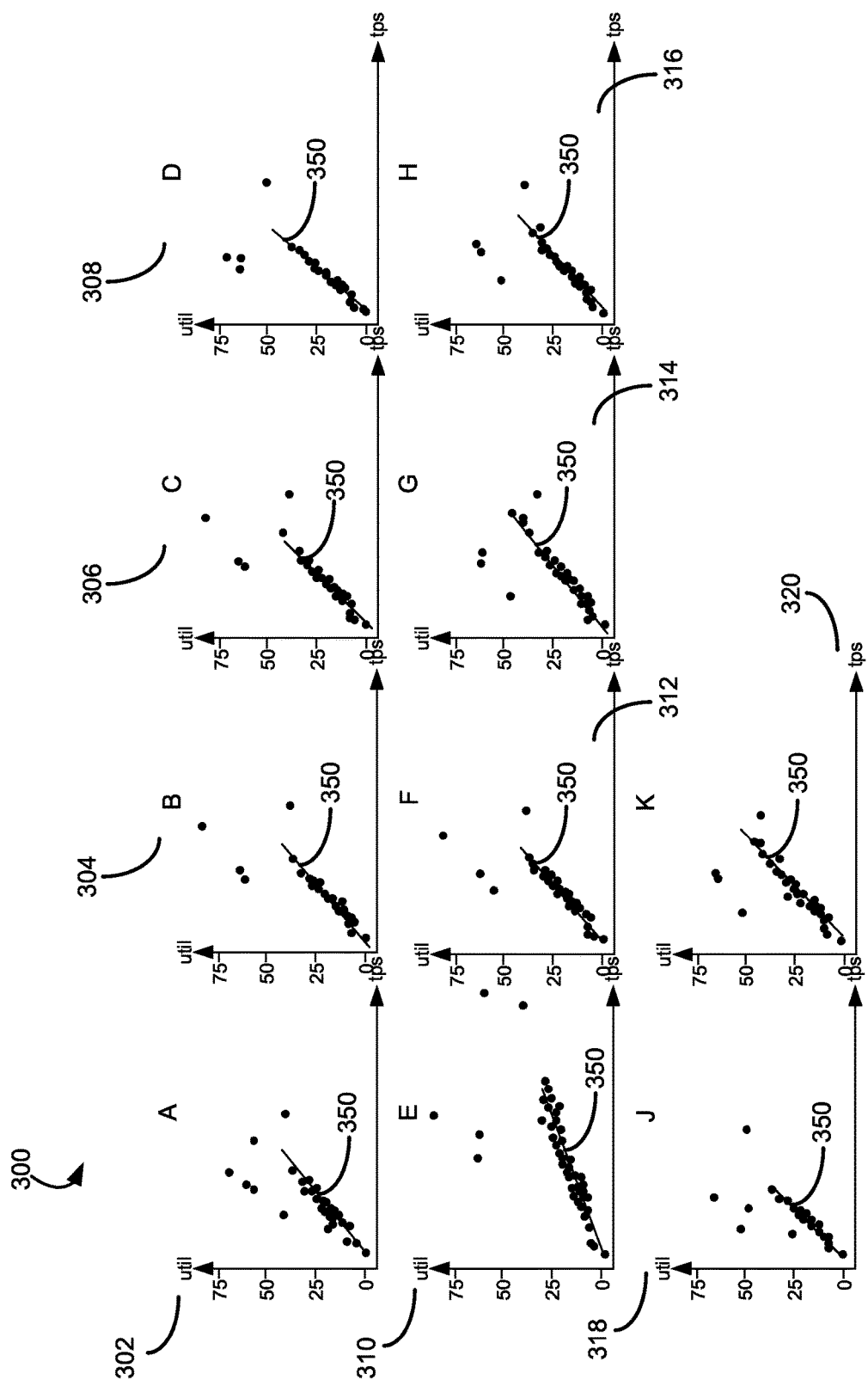
FIG. 3 is an illustration of several graphs of system operational data received from a plurality of storage drives.

FIG. 3 is an illustration of several graphs of system operational data received from a plurality of storage drives. In particular, the graphs 302-320 illustrate received SAR data (e.g., operational data) from storage drives A-K. Further, each graph 302-320 illustrates a received, measured, or determined utilization value along the y-axis of each graph versus SAR data (in this example, a received transactions per second value) along the x-axis of each graph. For example, graph 302 includes data points within the graph that plot a received utilization value versus a received transactions per second value for storage drive A, where each data point represents a value of the SAR data at an instance of time for that storage drive. Similar plots for storage devices B through K (304-320) are also illustrated. As can be seen, the graph 310 of the received utilization value versus the received transactions per second value for storage drive E is has data points with a spread distinguishable from the graphs for the other storage drives in this storage server, indicating that this drive is operating differently from the others.

Additionally, while the graphs 302-320 provide information for one predictive SAR value (namely, the transactions per second) versus the utilization value, other predictive SAR values can be similarly graphed. By graphing all or a portion of the operational coefficients of the drive equation discussed above, each predictive SAR value for the storage drives of the storage server may be included in the cluster plot 300 such that a more conclusive analysis of the drive performances may be obtained by the monitoring device.

Figure 4:
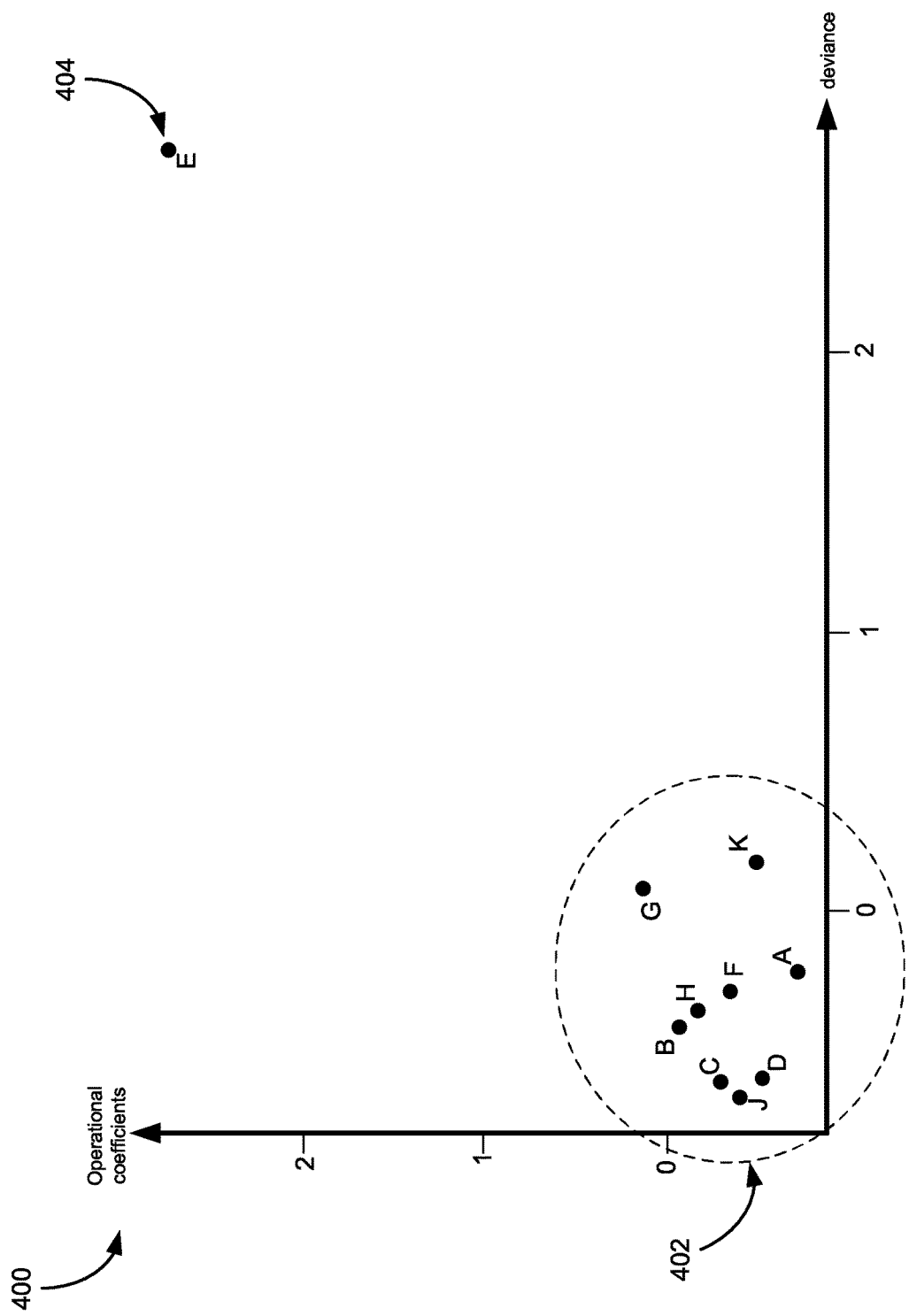
FIG. 4 is an illustration of a graph of a cluster plot of coefficients derived from system operational data received from a plurality of storage drives.

Through the process described above, the calculated operational coefficients for each of the storage drives in the storage server are further cluster plotted to determine if and how much any of the storage drives are outliers from the rest of the drives, as will be disclosed more fully in FIG. 4. The amount of deviance from the cluster indicates that a storage device may be behaving differently from the other devices. Alternatively, instead of clustering the operational coefficients, the monitoring device may create a model drive equation with model operational coefficients and plot the determined/measured drive operational coefficients against the model drive. The difference between the determined/measured operational coefficients from the ideal model operational coefficients would also indicate whether a storage devices was performing below the ideal performance.

Returning to the method 200 of FIG. 2, the monitoring device may initiate a remedial action or task on an identified outlying storage drive based on the operational coefficients determined or calculated above. For example, the monitoring device may access the storage server or server cluster and provide one or more instructions to the storage server to remove the identified outlying storage drive from service, such as turning the storage device off and migrating the data on the storage device to another storage device. The monitoring device may automatically schedule a maintenance event, or communicate with a system where maintenance may be scheduled. In another example, the monitoring device may provide one or more instructions to the storage server or cluster to reformat the identified outlying storage drive to improve the performance of the drive (such as correcting fragmentation problems). In general, any remedial action may be undertaken on the identified outlying storage drive to correct the underperformance of the drive.

Further, in some embodiments, the type of remedial action undertaken by the monitoring device on the identified storage drive may be based on the measured distance in a cluster plot that plots the operational coefficients of all the storage drives (e.g., storage drives A-K). One example of a cluster plot 400 of coefficient values is illustrated in FIG. 4. In particular, the cluster plot 400 includes coefficient values for storage drives A-K for a storage server or cluster. As should be appreciated, however, the cluster plot 400 of FIG. 4 is just an example of a cluster plot of the operational coefficients derived as described in FIG. 3. In general, any number and type of coefficient values (or any of the received SAR values) may be plotted in the cluster plot to determine an outlying storage device.

In operation 208, the monitoring device may analyze the cluster plot 400 of the operational coefficients to determine an outlying storage drive. An outlying storage drive will have an operational coefficient that lies outside the cluster. For example, the monitoring device may create the cluster plot 400 of FIG. 4 from the determined operational coefficients for storage drives A-K. As shown, storage drives A-D and F-K are clustered or grouped 402 within the plot 400 in the lower left-corner of the plot. However, the cluster plot for the operational coefficients for storage derive E 404 is located in the upper-right corner of the plot. Thus, the clustered data point for the operational coefficient of E 304 is separate from the grouped 402 data points of the operational coefficients of A-D and F-K. To determine an outlier within the cluster plot 400, the monitoring device may measure a distance from the cluster of data points 402 (say, the average value of cluster 402) between the operational coefficients for each of the storage drives and determine if one or more of the operational coefficients are located away from the cluster 402 in operation 210. For example, the monitoring device may determine that one or more operational coefficients in the cluster plot graph 400 exceed a particular threshold distance from every other operational coefficient in the graph. Those operational coefficients that exceed the threshold distance may be considered as outlier operational coefficients, and accordingly the storage drive associated with the outlier operational coefficient may be identified as performing differently than the storage drives within the cluster 402. The monitoring device may set any distance as the threshold distance within the cluster plot 400 to determine an outlier storage device from the group of plotted storage devices and their associated operational coefficients.

In general, an outlier operational coefficient 404 may indicate to the monitoring device that the storage device associated with those outlier operational coefficients is operating at different performance levels than the storage devices with operational coefficients within the clustered group 402. Further, the monitoring device may assume that the distance between any outlier operational coefficient 404 may relate to a performance variance that represents a failing device. For example, the further away from the clustered group 402 of operational coefficients that the outlying coefficient 402 appears in the plot 400, the more it may indicate a higher degree of operational disparity that the storage drive associated with the outlying operational coefficient has from the storage drives associated with the clustered group of operational coefficients. For example, the outlying operational coefficient 404 from the cluster 402 can indicate that storage drive E is underperforming more than storage drive G.

Thus, distances indicate the degree of operational disparity of the storage drives, which indicates their performance within the group of storage drives. Thus, a storage drive whose coefficient plot is relatively far from the clustered group in the graph 400 may be severely underperforming, while a storage drive whose operational coefficient is close to the clustered group of operational coefficients may have less severe performance issues. These can be set by threshold values: a first threshold distance can indicate a warning, while a second threshold distance can indicate a severe problem. The type of remedial action taken by the monitoring device may therefore be dependent on the determined distance of disparity in the cluster plot 400. Large distances, for example, may result in more severe remedial actions (such as removal or disabling of the storage drive from the storage server and spreading out the load across other storage drives) while shorter distances may result in less severe remedial actions (such as reformatting of the drive to correct fragmentation issues). Whether the distance is "large" or "small" can depend on disparity values set or determined (e.g., a distance representing a disparity, variation, or dispersion of less than 10% may be a first threshold for a "small" distance, while over 60% may be a second threshold for a "large" distance requiring more severe remedial actions). In this manner, not only may an underperforming storage drive be identified through the operations of the method 200, but a particular remedial action to improve the performance of the identified storage drive may be selected based on the measured disparity of the storage drive from the other drives in the storage server.

Figure 5:
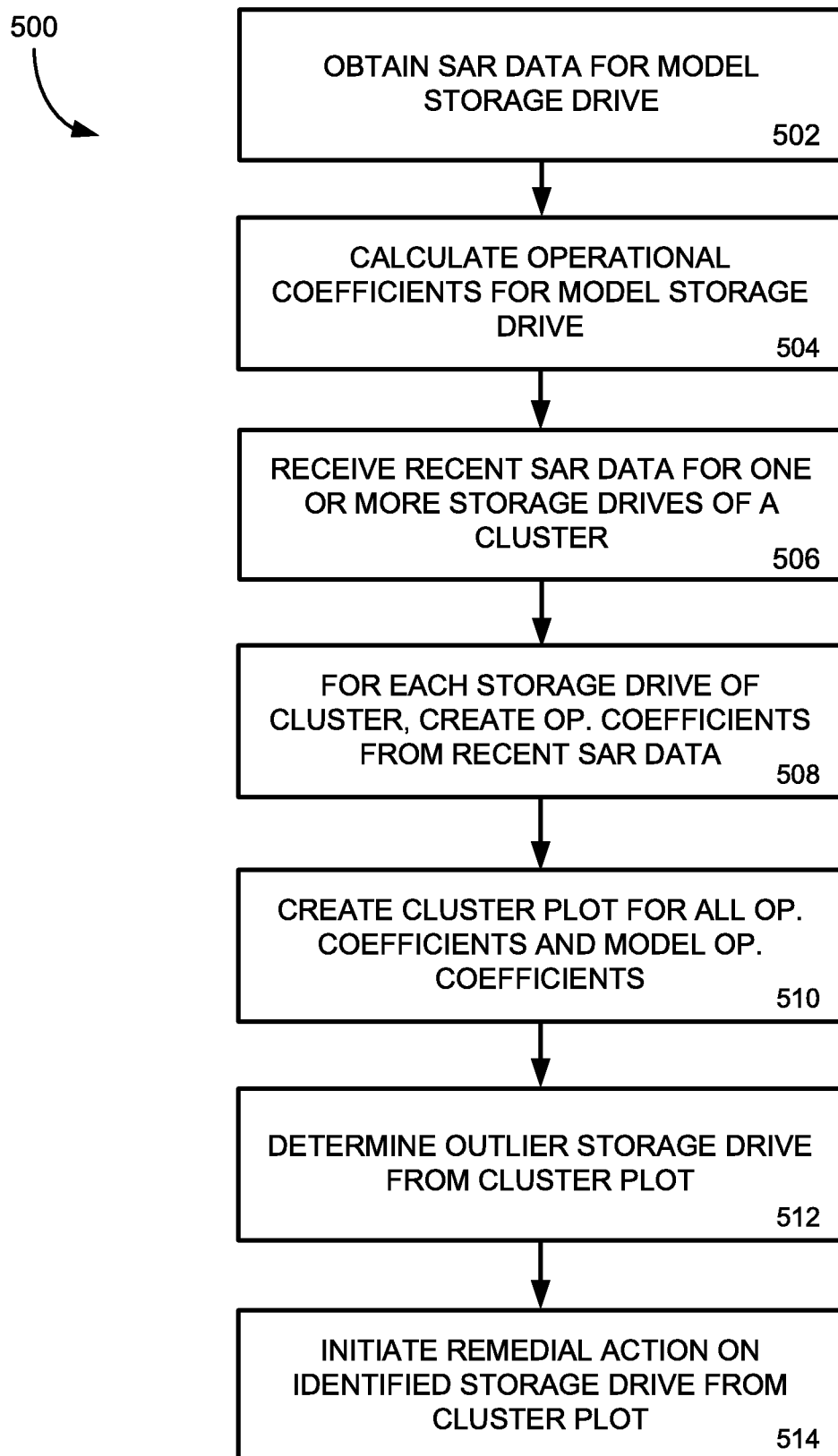
FIG. 5 is a flowchart of a method for creating a group of model coefficients for a particular type of storage drive and receiving and modeling system operational data from a plurality of storage drives with the model coefficients to identify performance issues in the storage drives.

FIG. 5 is a flowchart of a method for creating a group of model operational coefficients for a model of a type of storage drive and receiving and plotting system operational data from a plurality of storage drives with the model operational coefficients to identify performance issues in the storage drives. Similar to the above, the operations may be performed by the monitoring device described above. In other embodiments, one or more of the operations may be performed by any CDN or networking device to monitor the performance of the network. Also similar to the above, the method 500 allows the monitoring device (or collection of devices) to determine an underperforming or improperly performing storage drive of a storage server or cluster and to schedule or perform one or more remedial actions on the identified storage drive to improve the performance of the storage server or cluster.

In operation 502, the monitoring device receives or obtains SAR data for a model storage drive similar in type to a storage drive of the CDN. For example, the storage server of the CDN may include a particular type of disk hard drive. In another example, the storage server may include a solid-state type of hard drive to store data. For each type of storage drive (including different manufacturers of storage drives) of the CDN or network, the monitoring device may create an equation to model the performance of an ideal or properly working type of storage drive. To begin creating the model equation of a type of storage drive in the network, the monitoring device may receive model SAR data that indicates how a model drive type operates. In other words, the model SAR data received by the monitoring device may be operational data of the type of storage device under ideal network and operating conditions. In some embodiments, the model SAR data may be obtained from storage drives commissioned within the network that are determined to be operating properly. In other embodiments, the model SAR data is provided by a storage drive manufacturer or obtained through operation of the storage drive in a testing circumstance under proper conditions.

In operation 504, the monitoring device may create a group of model operational coefficients from the received model SAR data for the particular storage device type. In one embodiment, the monitoring device may calculate the model operational coefficients from the SAR data through one or more machine learning techniques, in a similar manner described above. In other words, the monitoring device may create multiple equations from the multiple instances of SAR data received from the model storage drive and, by processing the created equations through the machine learning techniques, create model operational coefficients that may be inserted into a model equation to estimate a performance value of the associated storage drive. With the operational coefficients, the monitoring device may insert received SAR data from a storage drive in the network and calculate an estimated performance (such as an estimated drive utilization value) of a model storage drive.

In operation 506, the monitoring device receives actual SAR data from one or more storage drives in the network. In general, the actual SAR data is received from storage drives in the network that are the same type of storage drive as that of the model equation discussed above. Also, similar to above, the actual SAR data may be for any period of time, such as every five minutes for the previous 24 hours. With the actual SAR data from the storage drives in the storage server of the network, the monitoring device may create or calculate operational coefficients for each storage drive providing the actual SAR data. The calculation of the operational coefficients for each storage drive may be done in a similar manner as described above by creating a plurality of drive-specific performance equations from the actual SAR data and applying those equations to one or more machine learning techniques to determine the operational coefficients.

With the operational coefficients determined, the monitoring device may compare the actual SAR data to the model by creating a cluster plot of each of the derived operational coefficients for the storage drives in the storage server or cluster in operation 510. In addition, the monitoring device may include the model operational coefficients in the cluster plot so that the cluster plot includes the operational coefficients of the storage devices from actual SAR data and the model operational coefficients based on a model storage drive. In operation 512, the monitoring device may then determine one or more outlier operational coefficients in the cluster plot as described above—the larger the outlier, the more the outlier storage device performs differently from a model storage device.

The monitoring device may determine a distance of each storage operational coefficient from the model operational coefficient. In other words, the monitoring device may determine if a distance that each operational coefficient is from the model operational coefficient exceeds or meets a threshold distance. In this manner, the monitoring device compares the operation or operational data of the storage drives to the model storage drive performance to see how underperforming the storage drives are from the model storage drive under a similar load condition. By comparing to the model operational coefficients, the monitoring device may not only determine if a storage drive is underperforming in relation to the other storage drives in the storage server, but also to determine how each of the storage drives are performing in relation to a model storage drive. This approach may determine underperforming storage drives, even if all of the storage drives in the storage server are underperforming in relation to the model storage drive (and are thereby clustered together in the cluster plot, despite the underperformance of all of the plotted storage drives).

In operation 514, the monitoring device may execute one or more remedial actions to the identified storage drives from the cluster plot analysis. Similar to the above, the monitoring device may perform a remedial action (such as placing the storage device in an offline state or reformatting the storage drive) by providing instructions to the storage server. Further, the type of remedial action may depend on a determined distance to the outlying storage device operational coefficient from a cluster of other storage device operational coefficients in the cluster plot. In another embodiment, the remedial action may be determined based on a distance in the cluster plot from model operational coefficients. In other words, the type of remedial action may be based on a difference in the measured performance of the storage drive from the estimated performance of a model storage drive of the same or similar type. As such, if each of the storage drives in the storage server are operating outside of an acceptable range when compared to the estimated operation of a model storage drive, a remedial action may be initiated for each of the storage drives in the storage server.

Figure 6:
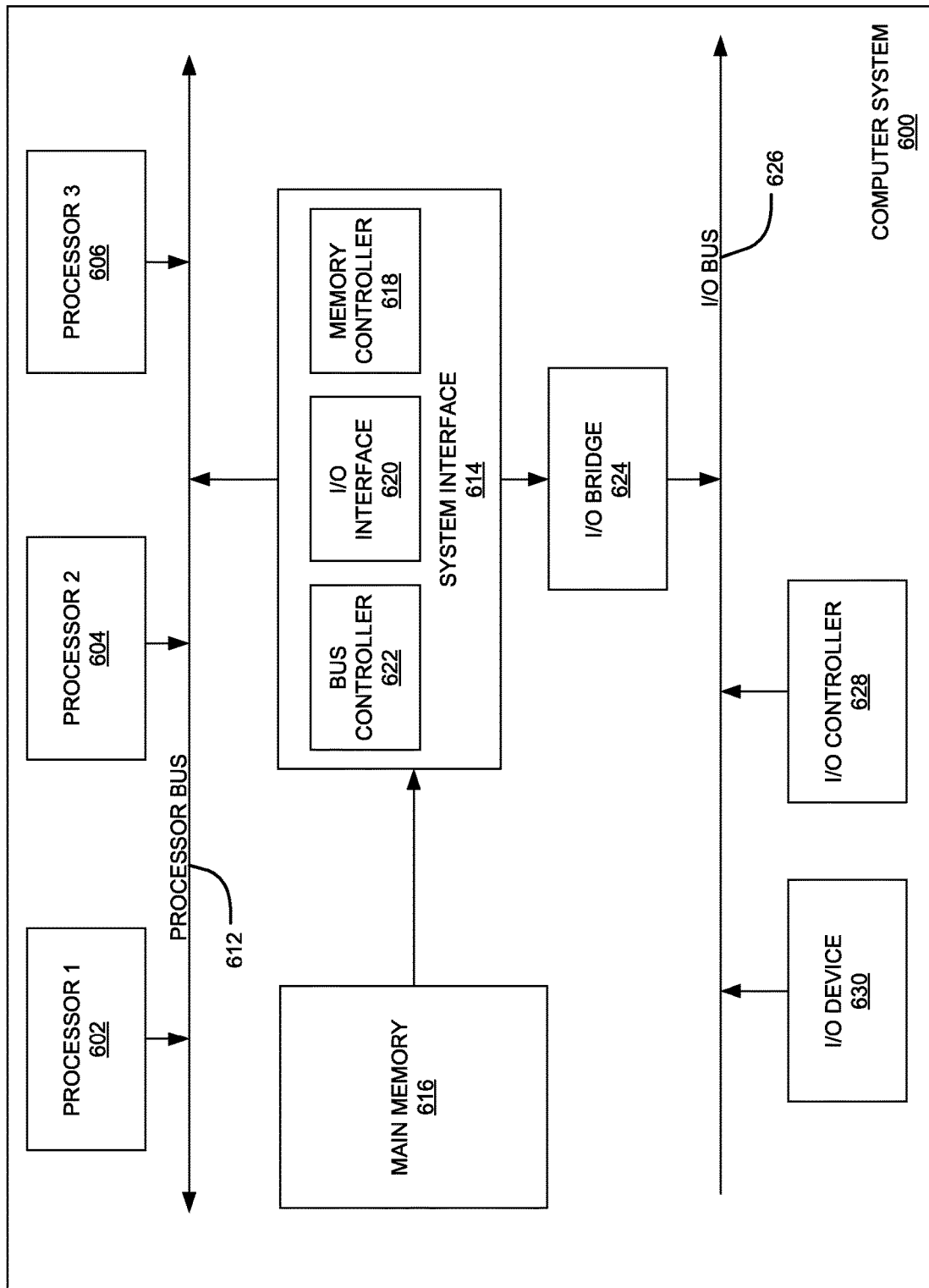
FIG. 6 is a diagram illustrating an example of a computing system which may be used in implementing embodiments of the present disclosure.

Through the systems and operations described herein, operational data of one or more storage server drives of a network may be monitored and analyzed to identify a potentially failing or underperforming storage drive. As such, the process and systems allow for a network to monitor for underperformance of any storage drive in the network to improve the overall function and efficiency of the network operation. Once identified, remedial actions can be performed on the underperforming storage drive based on the measured operational data of the drive. In one particular embodiment, a monitoring device periodically receives measured operational data from a plurality of storage drives of a storage server or cluster. With the received storage drive operational data, the monitoring device may utilize machine learning and/or statistical techniques to create a performance model for each drive associated with the storage server that includes a plurality of operational coefficients associated with particular performance metrics of the drives. The operational coefficients for all or some of the storage drives may be then be cluster plotted together to determine if an outlier storage drive is plotted in the graph. If so, the outlying storage drive may be identified as failing or underperforming. In addition, one or more remedial actions, such as reformatting, resetting, or removal from service, may be performed on the outlying storage drive. The type of remedial action may be based on a distance measurement from the other storage drives in the cluster plot, such that storage drives further away from the other storage drives in the cluster plot receive a more severe remedial action to fix the underperforming drive. In another embodiment, the operational coefficients of a model drive equation may be included in the cluster plot and any remedial action may be based on a measured difference of operation of the storage drives and the model storage drive. FIG. 6 is a block diagram illustrating an example of a computing device or computer system 600 which may be used in implementing the embodiments of the components of the network disclosed above. For example, the computing system 600 of FIG. 6 may be the monitoring device discussed above. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 618 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated. The system interface 614 may further include a bus controller 622 to interact with processor bus 612 and/or I/O bus 626.

I/O device 630 may also include an input device (not shown), such as an alphanumeric input device, including alphanumeric and other keys for communicating information and/or command selections to the processors 602-606. Another type of input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages should be understood by the foregoing description, and it should be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

We claim:

1. A method for operating a telecommunications network, the method comprising:
receiving operational data from a plurality of storage drives of a storage server of a telecommunications network;
deriving a plurality of operational coefficients for each of the plurality of storage drives based on the operational data;
generating a cluster plot comprising the plurality of operational coefficients for each of the plurality of storage drives;
calculating a distance between a subset of each operational coefficient of the plurality of operational coefficients of the cluster plot;
calculating a distance between each of the plurality of operational coefficients of the cluster plot and a plurality of operational coefficients for a model storage drive; and
initiating a remedial action on a storage drive of the plurality of storage drives when a calculated distance of an operational coefficient associated with the storage drive exceeds a distance value from a cluster of the cluster plot, wherein the remedial action is based on at least a calculated distance between a particular operational coefficient for the at least one storage drive and at least one of the operational coefficients for a model storage drive.

2. The method of claim 1, further comprising:
obtaining operational data from the model storage drive; and
calculating a plurality of operational coefficients for the model storage drive before calculating the distance between each of the plurality of operational coefficients of the cluster plot and a plurality of operational coefficients for the model storage drive, wherein the cluster plot further comprises a plot of the plurality of operational coefficients for the model storage drive.

3. The method of claim 1, further comprising determining a type of the remedial action based on the distance between a subset of operational coefficients of the cluster plot, wherein the type of the remedial action is at least one of reformatting, resetting, or taking offline one of the plurality of storage drives.

4. The method of claim 1, wherein the operational data is one or more of transactions per second, average wait time to execute a read or write to the storage drive, an average request size, number of write requests, number of read requests, or percentage of utilization of the drive.

5. The method of claim 1, wherein deriving the plurality of operational coefficients for each of the plurality of storage drives further comprises adjusting the operational coefficients through one or more machine learning techniques that model a performance of each of the plurality of storage drives.

6. The method of claim 1, further comprising determining a performance variance of storage device from the plurality of storage devices based on the distance between each operational coefficient from a cluster associated with the plurality of operational coefficients of the cluster plot, the distance indicating a degree of operational disparity from the cluster.

7. A system comprising:
a plurality of storage drives of a storage server; and a telecommunications network that provides communication between the plurality of storage drives, wherein the telecommunications network:
receives operational data from the plurality of storage drives of the storage server;
derives a plurality of operational coefficients for each of the plurality of storage drives based on the operational data;
generates a cluster plot comprising the plurality of operational coefficients for each of the plurality of storage drives;
calculates a distance between a subset of each operational coefficient of the plurality of operational coefficients of the cluster plot;
calculates a distance between each of the plurality of operational coefficients of the cluster plot and a plurality of operational coefficients for a model storage drive; and
initiates a remedial action on a storage drive of the plurality of storage drives when a calculated distance of an operational coefficient associated with the storage drive exceeds a distance value from a cluster of the cluster plot, wherein the remedial action is based on at least a calculated distance between a particular operational coefficient for the at least one storage drive and at least one of the operational coefficients for a model storage drive.

8. The system of claim 7, wherein the telecommunications network further:
obtains operational data from the model storage drive; and
calculates a plurality of operational coefficients for the model storage drive before calculating the distance between each of the plurality of operational coefficients of the cluster plot and a plurality of operational coefficients for the model storage drive, wherein the cluster plot further comprises a plot of the plurality of operational coefficients for the model storage drive.

9. The system of claim 7, wherein the telecommunications network further determines a type of the remedial action based on the distance between each operational coefficient of the cluster plot, wherein the type of the remedial action is at least one of reformatting, resetting, or taking offline one of the plurality of storage drives.

10. The system of claim 7, wherein the operational data is one or more of transactions per second, average wait time to execute a read or write to the storage drive, an average request size, number of write requests, number of read requests, or percentage of utilization of the drive.

11. The system of claim 7, wherein deriving the plurality of operational coefficients for each of the plurality of storage drives further comprises adjusting the operational coefficients through one or more machine learning techniques that model a performance of each of the plurality of storage drives.

12. The system of claim 7, wherein the telecommunications further determines a performance variance of the storage device from the plurality of storage devices based on the distance between each operational coefficient from a cluster associated with the plurality of operational coefficients of the cluster plot, the distance indicating a degree of operational disparity from the cluster.

13. A non-transitory computer-readable medium comprising instructions stored thereon, the instructions executable by one or more processors of a computing system to:
receive operational data from a plurality of storage drives of a storage server of a telecommunications network;
derive a plurality of operational coefficients for each of the plurality of storage drives based on the operational data;
generate a cluster plot comprising the plurality of operational coefficients for each of the plurality of storage drives;
calculate a distance between a subset of each operational coefficient of the plurality of operational coefficients of the cluster plot;
calculate a distance between each of the plurality of operational coefficients of the cluster plot and a plurality of operational coefficients for a model storage drive; and
initiate a remedial action on a storage drive of the plurality of storage drives when a calculated distance of an operational coefficient associated with the storage drive exceeds a distance value from a cluster of the cluster plot, wherein the remedial action is based on at least a calculated distance between a particular operational coefficient for the at least one storage drive and at least one of the operational coefficients for a model storage drive.

14. The non-transitory computer-readable medium of claim 13, further comprising instructions executable to:
obtain operational data from the model storage drive; and
calculate a plurality of operational coefficients for the model storage drive before calculating the distance between each of the plurality of operational coefficients of the cluster plot and a plurality of operational coefficients for the model storage drive, wherein the cluster plot further comprises a plot of the plurality of operational coefficients for the model storage drive.

15. The non-transitory computer-readable medium of claim 13, further comprising instructions executable to determine a type of the remedial action based on the distance between each operational coefficient of the cluster plot, wherein the type of the remedial action is at least one of reformatting, resetting, or taking offline one of the plurality of storage drives.

16. The non-transitory computer-readable medium of claim 13, wherein the operational data is one or more of transactions per second, average wait time to execute a read or write to the storage drive, an average request size, number of write requests, number of read requests, or percentage of utilization of the drive.

17. The non-transitory computer-readable medium of claim 13, wherein deriving the plurality of operational coefficients for each of the plurality of storage drives further comprises adjusting the operational coefficients through one or more machine learning techniques that model a performance of each of the plurality of storage drives.

* * * * *